United States Patent [19]
Moriya et al.

[11] Patent Number: 5,172,618
[45] Date of Patent: Dec. 22, 1992

[54] CUTTING MACHINE AND METHOD FOR POSITIONING END OF WORKPIECE TO BE CUT IN CUTTING MACHINE

[75] Inventors: Kikuo Moriya, Machida; Isomi Washio, Hadano, both of Japan

[73] Assignee: Amada Company, Limited, Japan

[21] Appl. No.: 724,893

[22] Filed: Jul. 2, 1991

Related U.S. Application Data

[62] Division of Ser. No. 354,359, May 19, 1989, Pat. No. 5,060,547.

[30] Foreign Application Priority Data

May 20, 1988 [JP] Japan ................. 63-122120
Feb. 9, 1989 [JP] Japan ................. 1-28691

[51] Int. Cl.⁵ .............................. B26D 1/00
[52] U.S. Cl. .............................. 83/13; 83/364; 83/365; 83/367
[58] Field of Search ......... 83/13, 72, 76, 76.8, 83/365, 367, 369, 370, 789, 364, 209, 210, 263, 264, 403.1

[56] References Cited

U.S. PATENT DOCUMENTS

| 4,216,688 | 8/1980 | Cash | 83/369 |
| 4,557,169 | 12/1985 | Kajiya et al. | 83/211 |
| 4,594,923 | 6/1986 | Fujita | 83/369 |
| 4,596,172 | 6/1986 | Visser | 83/210 |
| 4,655,067 | 4/1987 | Frost et al. | 83/367 |
| 4,805,500 | 2/1989 | Saito et al. | 83/390 |
| 4,829,864 | 5/1989 | Yanagisawa et al. | 83/209 |

FOREIGN PATENT DOCUMENTS

| 894022 | 2/1960 | United Kingdom . |
| 1307819 | 4/1969 | United Kingdom . |
| 1413106 | 10/1971 | United Kingdom . |

Primary Examiner—Douglas D. Watts
Assistant Examiner—Hwei-Siu Payer
Attorney, Agent, or Firm—Wigman & Cohen

[57] ABSTRACT

The invention is a cutting machine and its method of operation. The machine contains a vise, a feed mechanism for positioning a workpiece toward the cutting position, a mechanism for detecting the front end of the workpiece, a mechanism for detecting the transfer distance of the front end of the workpiece, a machanism acting in conjunction with the last two referenced mechanisms to reduce the feed speed of the workpiece, a mechanism to control the feed velocity of the workpiece, a mechanism to contact the first end of the workpiece, and a mechanism to halt the speed of the workpiece.

4 Claims, 7 Drawing Sheets

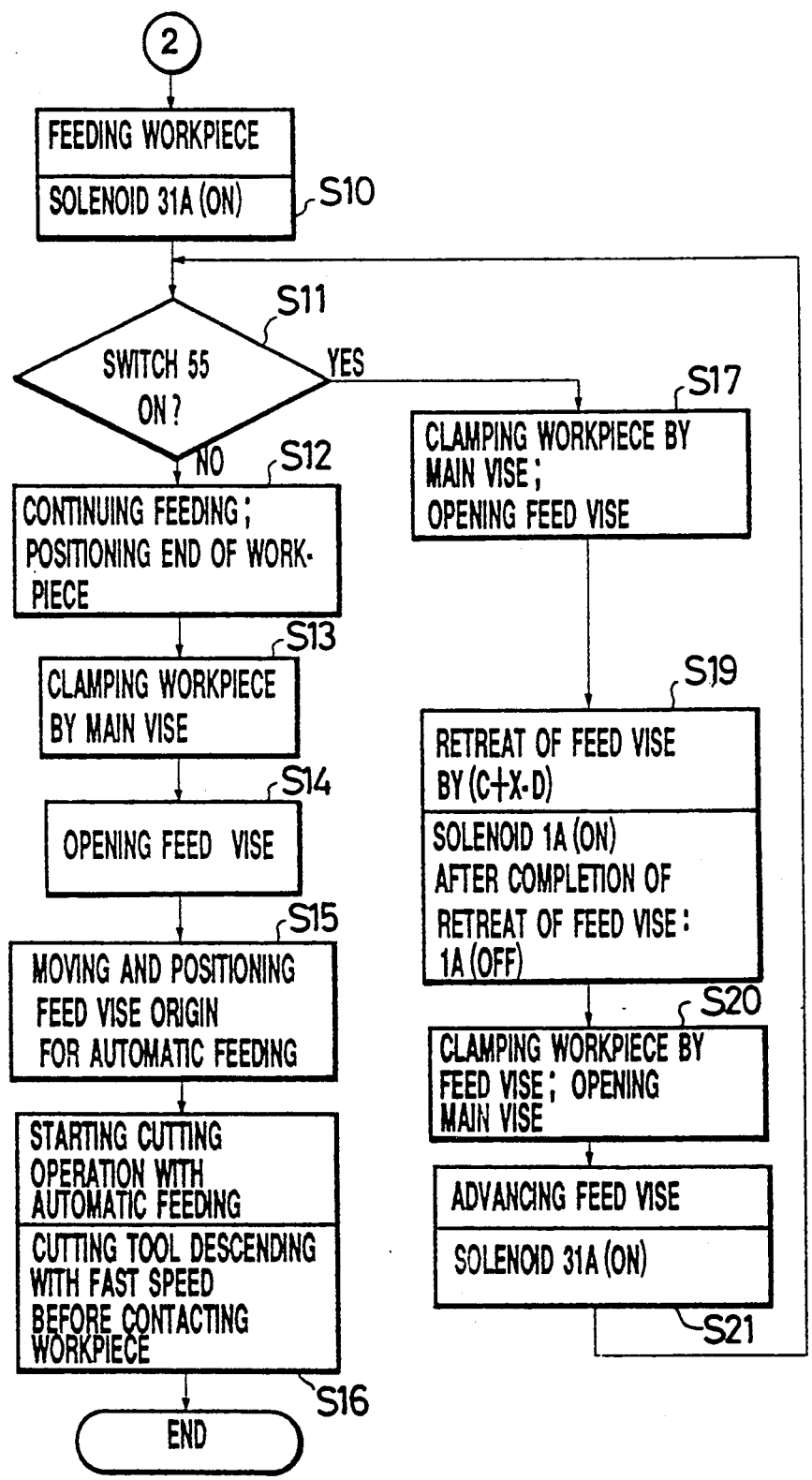

CUTTING MACHINE AND METHOD FOR POSITIONING END OF WORKPIECE TO BE CUT IN CUTTING MACHINE

This is a divisional of co-pending application Ser. No. 07/354,359 filed on May 19, 1989. Now U.S. Pat. No. 5,060,547.

BACKGROUND OF THE INVENTION

1. Field of the Invention

The present invention relates to a cutting machine for cutting a long material such as, for example, a bar material, and to a method for positioning the end of the workpiece to be cut off in that cutting machine.

2. Description of the Prior Art

Various types of cutting machines are used to cut a long material. For example, such a cutting machine may be a band saw machine, a circular saw machine, a disc cutter, or the like.

When such cutting machines are constructed so that the workpiece can be fed automatically to be cut, a main vise device, which is disposed near cutting position and interposedly secures the workpiece during cutting operation, and a feed vise device, which feeds the workpiece, are provided.

Conventionally, to cut the workpiece, first the workpiece is transported to the cutting machine by a suitable transport device, such as a crane, fork lift truck, or the like. Next, after the transported workpiece is clamped in the feed vise device, the feed vise device is moved so that the end of the workpiece is positioned at the cutting position. After the workpiece is interposedly secured in the main vise device, the end section of the workpiece is cut off (the trimming operation). Then, after the end section of the workpiece has been cut off, the feeding operation is performed by the feed vise device from the cut position so that the workpiece is pushed forward by just one unit length (dimension).

Specifically, in such a conventional device, because the end of the workpiece is cut off in the first place, it is easy to set the standard position for the feed vise device or the workpiece wherein the end of the workpiece is positioned in the cutting position; and it is possible to commence feeding the workpiece by a unit length so that semimanufactured goods can be easily cut off.

However, in recent years, along with the advance of multivariety and small number production, or and synchronized production, it has become necessary, for example, to cut only the necessary number of semimanufactured products from one long workpiece and store the remainder of the workpiece in the warehouse. Then, when it again becomes necessary to cut the same workpiece, that workpiece is transported to the cutting machine once more and only the necessary number of semimanufactured products are cut from the workpiece.

When the workpiece is to be cut for the second time, as noted above, because the end of the workpiece was cut during the previous cut it is not necessary to again trim the end of the workpiece. Accordingly, the operator, after transporting the workpiece to the cutting machine, measures the position of the end face of the workpiece with a scale, and performs an operation for adjusting the end of the workpiece to agree with the cutting position.

The adjustment operation such as outlined above, is carried out by slightly advancing or retracting the feed vise device which has clamped the workpiece. This adjusting operation is not only a lot of work, but because of errors in the scale and the like, a considerable amount of time is required to make the end of the workpiece agree with the cutting position.

SUMMARY OF THE INVENTION

A first object of the present invention is to provide, with due consideration to the drawbacks of such conventional devices, a cutting machine and a positioning method by which it is possible to easily position the end of a workpiece at a standard position.

A second object of the present invention is to provide a cutting machine and a positioning method by which it is possible to automatically position the end of a workpiece at a standard position.

A third object of the present invention is to provide a cutting machine and a positioning method by which it is possible to automatically position the end of a workpiece at a cutting position as a standard position.

BRIEF DESCRIPTION OF THE DRAWINGS

These and other objects, features, and advantages of the present invention will become more apparent from the following description of the preferred embodiments taken in conjunction with the accompanying drawings, in which:

FIG. 6a and 6b are flowcharts for explaining the operation of the fourth embodiment of the present invention.

DETAILED DESCRIPTION OF THE PREFERRED EMBODIMENTS

Figure 1:
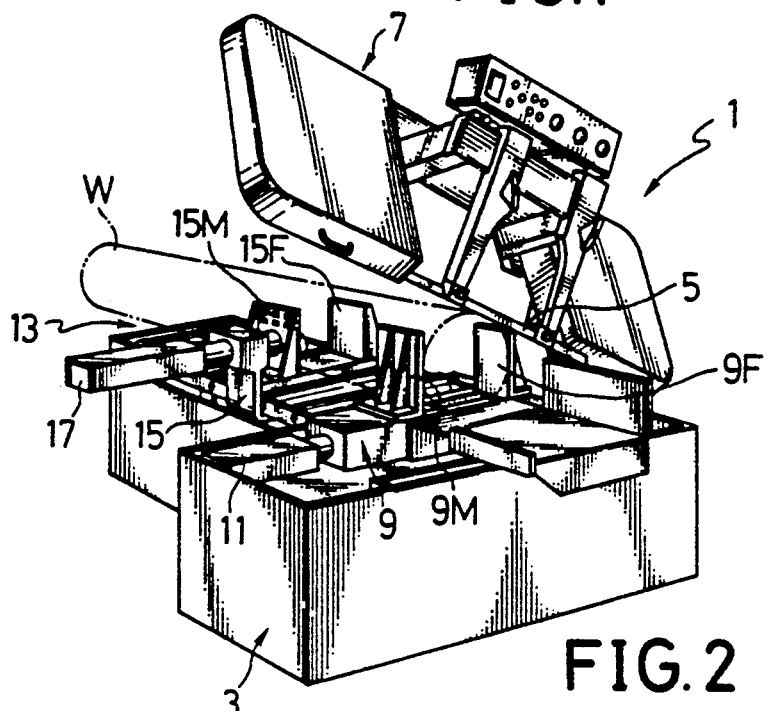
FIG. 1 is a perspective drawing of a common horizontal band saw machine as one example of the cutting machine according to the present invention.

Now referring to FIG. 1, a horizontal band saw machine is shown as an example of a cutting machine 1. An explanation will be given for this embodiment using the case where the horizontal band saw machine is one type of cutting machine, but this is only by way of example. The present invention can be implementing various other types of cutting machines, such as a vertical band saw machine, a circular saw machine, a disc cutting machine or the like.

A horizontal band saw machine as the cutting machine 1 is commonly known, but the outline given in explanation, using FIG. 1, can be applied to all configurations.

The cutting machine 1 is provided with a box-shaped base 3 which supports a long workpiece W. A cutting head 7 equipped with a cutting tool 5 which cuts the workpiece W is capable of freely vertical elevation. As is commonly known, the cutting tool 5 on the horizontal band saw is a horizontal saw blade, and the workpiece W is cut vertically by the cutting tool 5 as a result of the elevating action of the cutting head 7.

A main vise device 9 is provided on the base 3 to interposedly secure the workpiece W in the vicinity of the cutting position to be cut by the cutting tool 5. The main vise device 9 comprises a fixed vise jaw 9F and a movable vise jaw 9M for clamping the workpiece W. A hydraulic cylinder 11 is provided to move the movable vise jaw 9M reciprocally.

A workpiece support stand 13 is provided on the rear of the main vise device 9 to feed the workpiece W. A feed vise device 15 is provided in a manner allowing it to move the workpiece W freely and reciprocally in the feed direction. As is commonly known, the feed vise device 15 comprises a fixed vise jaw 15F and a movable vise jaw 15M for clamping the workpiece W, and a hydraulic cylinder 17 is provided for moving the movable vise jaw 15M. The reciprocal action of the feed vise device 15 for performing the feed operation is produced by means of a commonly known feed cylinder or by a feed screw mechanism (omitted from FIG. 1).

The cutting machine 1 with a configuration as outlined above is commonly known, so a more detailed explanation of its structure and operation will be omitted here.

Figure 2:
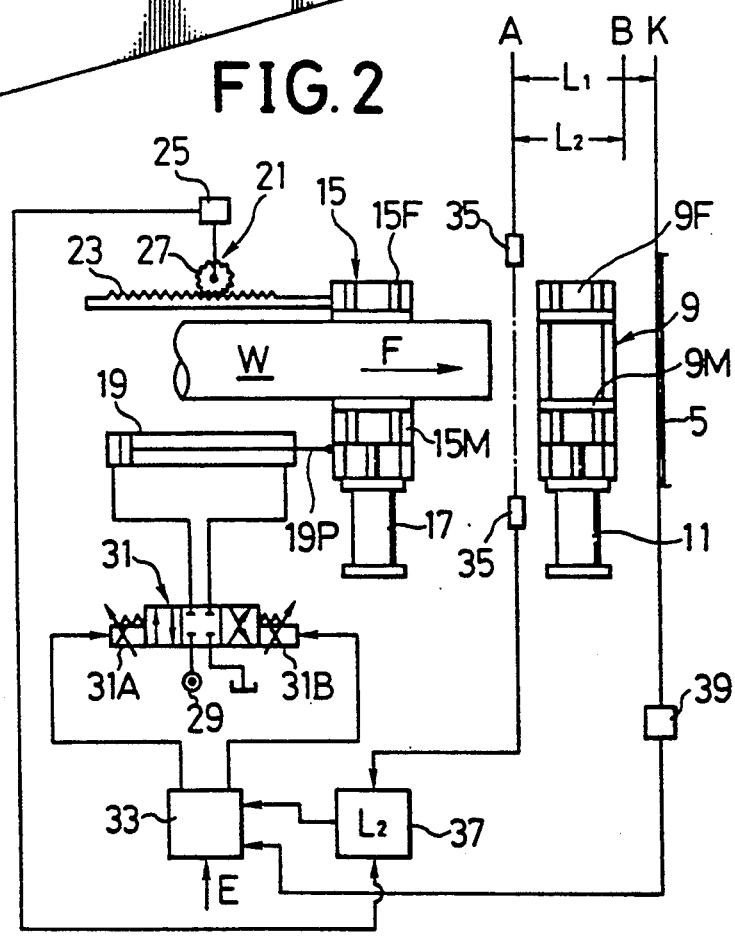
FIG. 2 is a drawing explaining the operation of a first embodiment of the present invention, shown on a plane surface.

Now referring to FIG. 2, the general concept of a first embodiment of the present invention is shown.

In FIG. 2 a piston rod 19P of a feed cylinder 19 is connected to the feed vise device 15 for reciprocally moving the feed vise device 15 in the feed direction F. A transfer distance detection means 21 for detecting the transfer distance of the end of the feed vise device 15 is provided on the workpiece support stand 13.

In this embodiment of the present invention, a configuration by which a pinion 27 coupled with a detector 25 such as a rotary encoder engages a rack 23 provided on the feed vise device 15, has been adopted as the transfer distance detection means 21. Accordingly, when the feed vise device 15 moves, a pulse corresponding to that movement is produced from the detector 25, so that by counting and suitably processing the pulse, the direction of movement, the transfer distance, and the speed of movement of the feed vise device 15 can be detected.

The configuration of the transfer position detection device 21 is not restricted to the abovementioned configuration. It can be, for example, a configuration by which the pinion 27 and the detector 25 is mounted on the side of the feed vise device 15, and the rack 23 is provided on the fixed side. In addition, it is also possible to use a completely different configuration than the above. For example, a magnetic scale or a linear scale such as an induction scale can be used.

A magnetic proportional throttling directional switching valve 31 (electro-magnetic solenoid valve -hereinafter referred to as the magnetic proportional valve 31) is positioned between a pressure source 29 and the feed cylinder 19 for controlling the action of the feed cylinder 19. When a solenoid 31A is energized, the magnetic proportional valve 31 cause the room on the piston side of the feed cylinder 19 to communicate with the pressure source 29, and the degree of throttling is controlled in proportion to the value of the current supplied to the solenoid 31A. In addition, when a solenoid 31B is energized, the room on the rod side of the feed cylinder 19 communicate with the pressure source 29, and the degree of throttling is controlled in proportion to the magnitude of the current supplied.

A feed velocity control means 33 is provided to control the magnetic proportional valve 31, and to control the direction of action and the feed velocity of the feed cylinder 19. The feed velocity control means 33 controls the energizing current to the solenoids 31A, 31B of the magnetic proportional valve 31, and further controls the feed direction and the feed velocity of the feed vise device 15.

In order to detect the end section of the workpiece W which is clamped and fed by the feed vise device 15, a suitable end detection means 35 which can be a sensor such as, for example, an ultrasonic sensor, a laser sensor, a photoelectric switch, or the like is provided at a position K A, a specified distance $L_1$ in front of the cutting position of the cutting tool 5. The signal detected by the end detection means 35 is input to a speed reduction and position setting means 37.

The speed reduction and position setting means 37 can be, for example, a preset counter or the like. When the signal from the end detection means 35 is input to the speed reduction and position setting means 37, the pulses input from the detector 25 of the transfer distance detection device 21 are counted, and when the number of pulses reach a set value proportional to a distance $L_2$ of a point B, set in advance, a speed reduction start signal is output to the feed velocity control means 33.

The speed of the feed vise device 15 is reduced and feeding is performed. A contact detection means 39 is provided to detect when the end of the workpiece W has contacted the cutting tool 5. When the contact detection means 39 detects the contact, a contact signal is input to the feed velocity control means 33 and the feeding action of the feed vise device 15 is halted.

The configuration of the contact detection means 39 can be as follows. For example, both the workpiece W and the cutting tool 5 can be electrically insulated, and under the conditions where a low voltage is applied between the two, when contact is made, a change in voltage is detected. It is also possible to provide a microswitch or the like on a support section which supports the cutting tool 5 on the cutting head 7, so that when the workpiece W contacts the cutting tool 5 the microswitch detects the slight tremor which occurs.

With a configuration of the type outlined above, a transport device such as a crane or a fork lift truck is used to transport the workpiece W to the position of the feed vise device 15 which is in the retracted position. When the feed vise device 15 has clamped the workpiece W, a control signal E is input to the feed velocity control means 33 from, for example, a numerical control device (omitted from the drawings), and when the solenoid 31A of the magnetic proportional valve 31 is energized, feeding by the feed vise device 15 is commenced. The feed velocity of the feed vise device 15 is controlled proportional to the energizing current in the solenoid 31A.

When the feeding by the feed vise device 15 begins and the end of the workpiece W reaches the position of the end detection means 35, the end detection means 35 detects the end of the workpiece W and the detection signal is forwarded to the speed reduction and position setting means 37.

When the detection signal from the end detection means 35 is input to the speed reduction and position setting means 37, the count of the pulse signals input from the detector 25 of the transfer distance detection device 21 is begun. Then, when the value of this count reaches a previously set value ($L_2$), the speed reduction signal from the speed reduction and position setting means 37 is forwarded to the feed velocity control means 33. In the case where the set value is zero, the reduction of the feed velocity occurs simultaneously with the detection of the end of the workpiece W by the end detection means 35.

When the speed reduction signal is input from the speed reduction and position setting means 37 to the feed velocity control means 33, the current which energizes the solenoid 31A of the magnetic proportional valve 31 is reduced and the feeding speed is reduced to the specified value.

Under the reduced feeding speed conditions, the end of the workpiece W reaches the cutting position K. When the end of the workpiece W contacts the cutting tool 5, the contact detection means 39 is activated, a halt signal is input to the feed velocity control means 33, and the solenoid 31A of the magnetic proportional valve 31 is demagnetized so that the feeding action is immediately halted.

Accordingly, the end of the workpiece W is positioned at the cutting position.

After the end of the workpiece W is positioned at the cutting position as outlined above, for example, the conventional cutting operation is performed with the cutting position being set as the standard position for the conventional unit length feeding operation; thus the conventional cutting operation can be performed without trimming the end of the workpiece.

Figure 3:
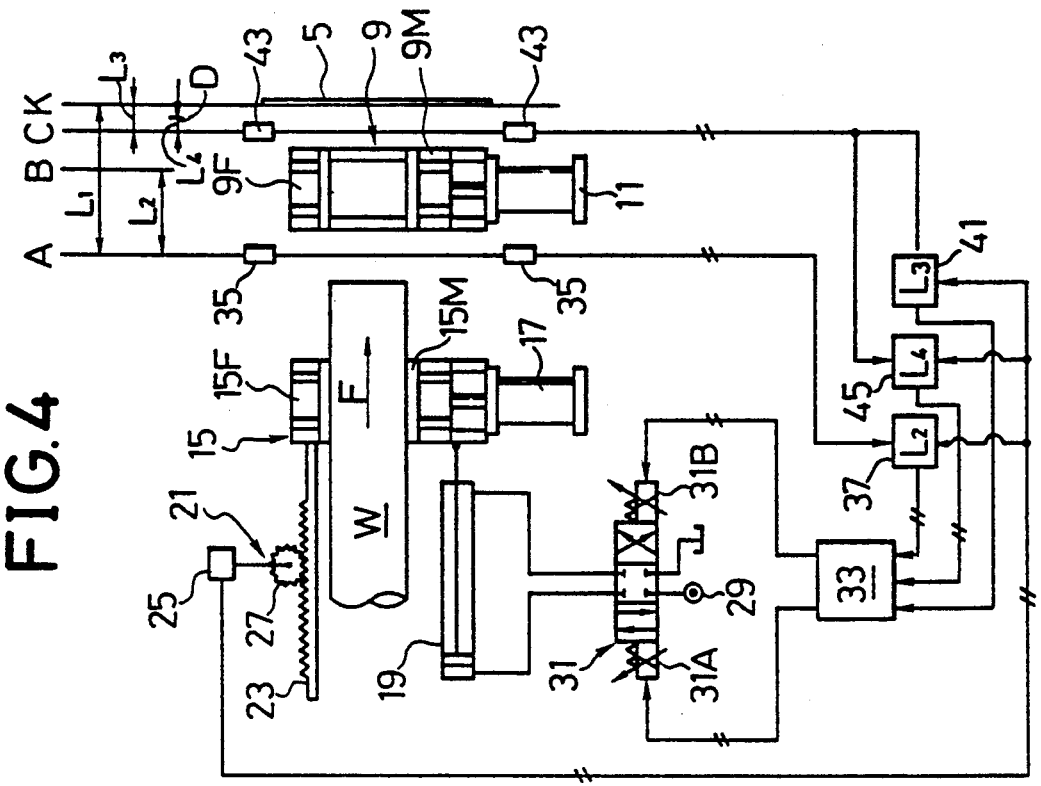
FIG. 3 and FIG. 4 are drawings explaining the operation of a second and third embodiment of the present invention, respectively.

FIG. 3 shows a second embodiment of the present invention. The structural parts which bear the same numeral as the structural parts in the first embodiment have exactly the same function so a more detailed explanation will be omitted here.

In the second embodiment of the present invention, although this configuration omits the contact detection means 39 of the first embodiment, it is still possible to accurately position the end of the workpiece W at the cutting position. Specifically, in the second embodiment, a halt position setting means 41 is provided to set the halt position of the end of the workpiece W. The halt position setting means 41 can be, for example, a preset counter, or the like. When a signal indicating the detection of the end of the workpiece W by the end detection means 35 is input, the counting of the pulse signal from the detector 25 begins, and when the count reaches a preset value corresponding to the distance $L_1$ to the position K which has been set in advance, a halt signal is output to the feed velocity control means 33.

Accordingly, in the second embodiment as previously described, the feeding of the feed vise device 15 commences and when the end of the workpiece W reaches the position B being $L_2$ away from the end detection means 35, a suitable reduction in speed occurs and the halt position setting means 41 begins counting. Then, the end of the workpiece W is moved by a preset distance, for example $L_1$, from the position of the end detection means 35, and when the cutting position is reached, a halt signal is output from the halt position setting means 41 and the feeding stops.

Specifically, by means of the second embodiment, by simply changing the set point of the halt position setting means 41, it is possible to halt the end of the workpiece W in an arbitrary position so that the positioning of the end of the workpiece W at the cutting position is easily carried out.

Figure 4:
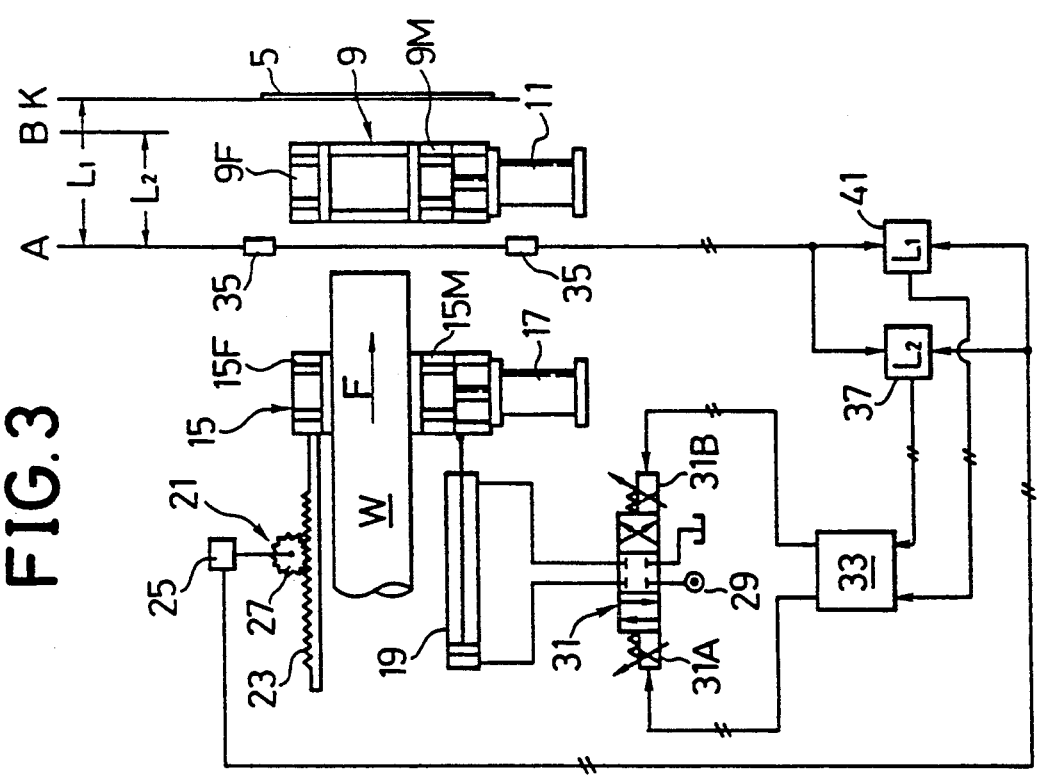

FIG. 4 shows a third embodiment of the present invention. In this embodiment, the speed reduction of the feeding operation of the second embodiment is performed in two stages.

Specifically, in this third embodiment of the present invention, a second end detection means 43 is positioned between the end detection means 35 and the cutting position. A detection signal from the second end detection means 43 is input to the halt position setting means 41 and a second speed reduction and position setting means 45. The second speed reduction and position setting means 45 has the same function as the speed reduction and position setting means 37.

In the third embodiment of the present invention, the feeding operation of the feed vise device 15 commences, and when the end of the workpiece W reaches the position B being $L_2$ away from the end detection means 35, as previously outlined, the feed velocity of the workpiece W is reduced (first stage reduction), after which, when the end of the workpiece W reaches the position D being $L_4$ away from the second end detection means 43, the second stage speed reduction is performed.

Specifically, when the second end detection means 43 detects the end of the workpiece W, the detection signal is input to both the halt position setting means 41 and the second speed reduction and position setting means 45. The second speed reduction and position setting means 45 then commences to count the pulse signal from the detector 25. When the value of the count is equal to a value equivalent to a distance $L_4$ from a previously set position D, a speed reduction signal is sent to the feed velocity control means 33 from the second speed reduction and position setting means 45, and the feed velocity is further reduced. After this, when the value of the count by the halt position setting means 41 is equal to the count corresponding to the distance $L_3$, a halt signal is transmitted to the feed velocity control means 33, and the feeding is stopped.

Figure 5:
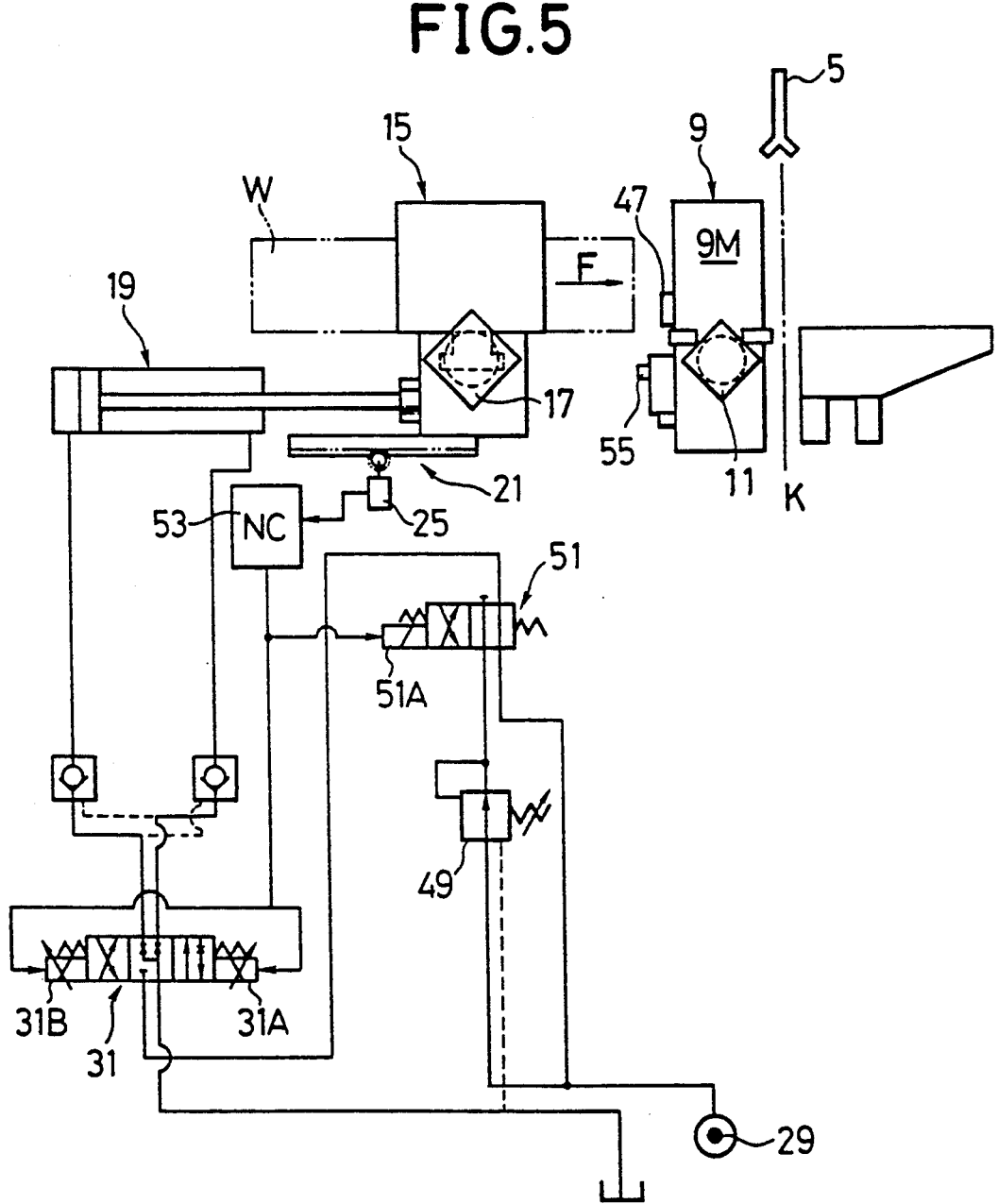
FIG. 5 is an explanatory drawing of a fourth embodiment of the present invention.

FIG. 5 is a schematical side elevational view of a fourth embodiment of the present invention. In this embodiment of the present invention, the end of the workpiece W strikes a stopper member 47 provided on the movable vise jaw 9M of the main vise device 9, and the end of the workpiece W is positioned.

Specifically, when the end of the workpiece W strike the stopper member 47, the feeding of the feed vise device 15 momentarily halted, and the output of the pulse signal from the detector 25 to the NC device 53 ceases. Then a halt signal is output from the NC device 53 so that the solenoid 31A of the magnetic proportional valve 31 is demagnetized and the feeding action is halted.

Next, the feeding operation corresponding to the length of cut commences from the strike position, as explained in detail hereinafter.

In addition, in this fourth embodiment, a pressure reducing valve 49 and a switching valve 51 are positioned between the magnetic proportional valve 31 and the pressure source 29, so that the pressure of the fluid supplied to the feed cylinder 19 can be switched to a low or a high pressure. Control of the magnetic proportional valve 31 and switching control of the switching valve 51 and the like are performed by the NC device 53.

The action of the fourth embodiment of the present invention will now be explained with reference to FIGS. 6 to 10.

Figure 6A:
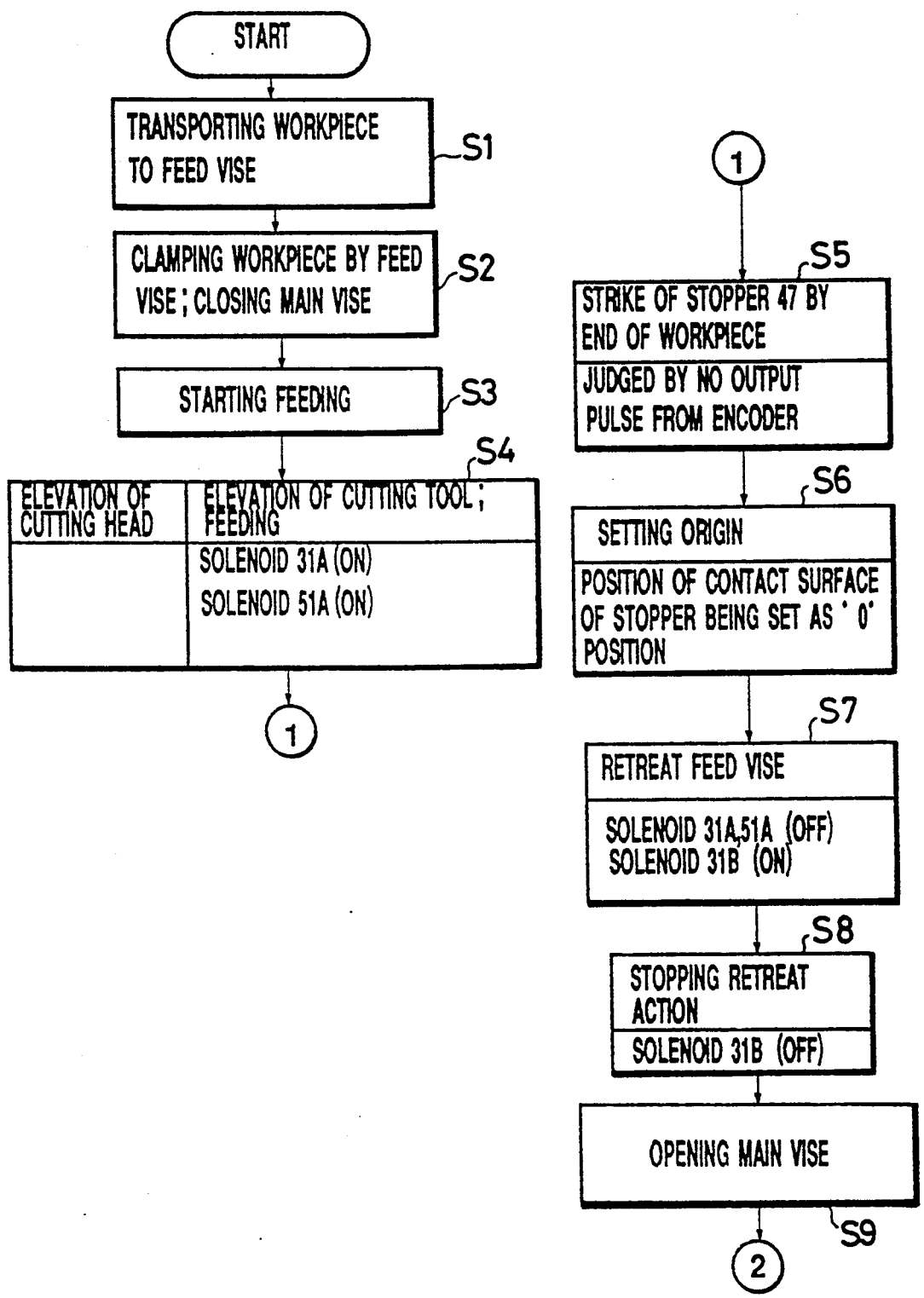

First, in Step $S_1$ of FIG. 6, the workpiece W is transported to the feed vise device 15 by a crane or the like.

In Step $S_2$, the workpiece W is clamped by the feed vise device 15. The movable vise jaw 9M on the main vise device 9 is moved to the fixed vise jaw 9F side and closed. The stopper member 47 mounted on the movable vise jaw 9M is placed to face the end of the workpiece W.

In Step $S_3$, the positioning of the end of the workpiece W is started.

In Step $S_4$, while the cutting head 7 is elevated, the solenoid 31A of the magnetic proportional valve 31 is energized, hydraulic fluid is supplied to the feed cylinder 19, and the feed vise device 15 is advanced. Until the workpiece W strike the stopper member 47, the solenoid 51A of the switching valve 51 is energized so the hydraulic fluid for which the pressure is reduced by the pressure reducing valve 49, is supplied to the feed cylinder 19. Thus, the workpiece W strikes the stopper member 47 with low pressure. Accordingly, when the workpiece W strike the stopper member 47 no slippage occured between the workpiece W and the feed vise device 15.

Figure 7:
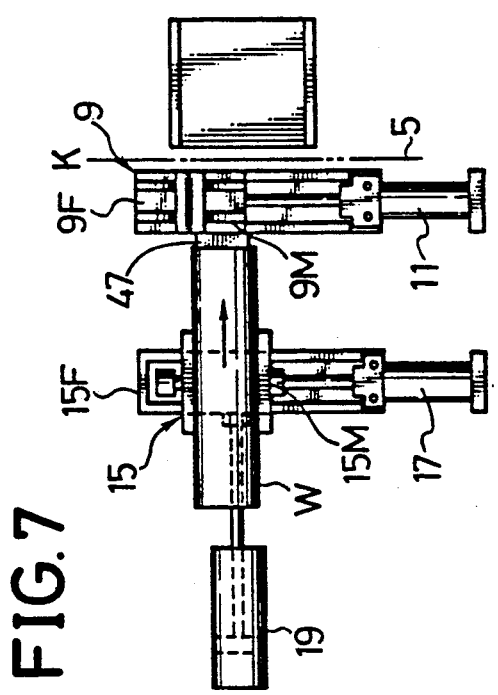

In Step $S_5$, the end of the workpiece W strikes the stopper member 47 (see FIG. 7). Then, as explained before, the pulse signal output from the sensor 25 in the transfer distance detection means 21 is ceased.

In Step $S_6$, the position at which the end of the workpiece W strikes the stopper member 47 is set as the origin for positioning the end of the workpiece W.

In Step $S_7$, the magnetic proportional valve 31 is switched so that the feed vise device 15 retreats by a very small distance H (see FIG. 8); also the solenoid in the switching valve 51 is de-energized.

In Step $S_8$, the feed vise device 15 stops at the position to which it had retreated by the very small distance H.

Figure 8:
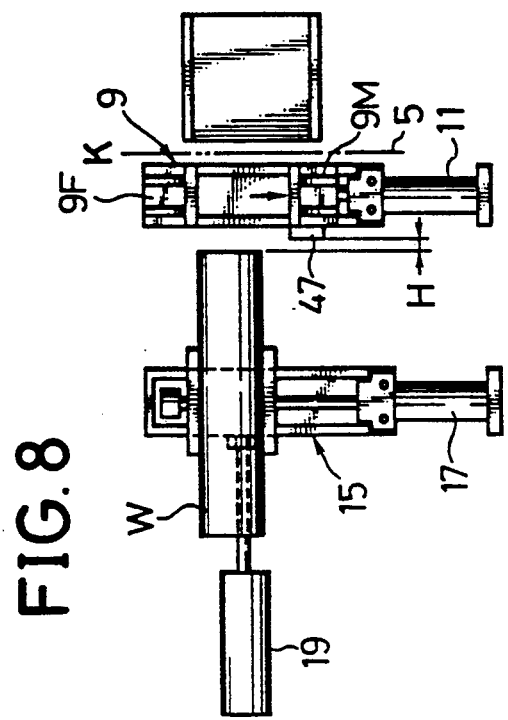
FIGS. 7 to 10 are explanatory drawings showing the operating conditions of the fourth embodiment of the present invention.
Figure 10:
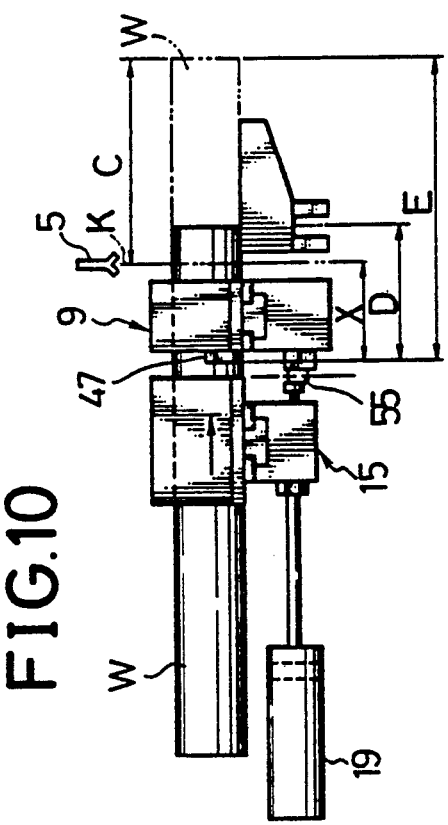

In Step $S_9$, the movable vise jaw 9M on the main vise device 9 is moved away from the fixed vise jaw 9F and is fully opened (see FIG. 8).

In Step $S_{10}$, the solenoid 31A of the magnetic proportional valve 31 is once again energized and the feed vice device 15 is advanced.

In Step $S_{11}$, the decision is made as to whether the switch 55 (see FIG. 5) mounted on the main vise device 9 for detecting the feed vise device 15 has been activated or not.

If the switch 55 has not been activated, the feed vise device 15 has not reached the forward end, so in Step $S_{12}$, the feeding action continues, the pulses output from the detector 25 in the transfer distance detection means 21 are counted by the NC device 53, and when the movement of the end of the workpiece W by a set distance from the origin set point position (the position where it contacts the stopper member 47) is detected, the feeding is halted and the positioning is completed. In this case, the distance X (see FIG. 9) from the stopped member 47 to the cutting position is already known, so the positioning of the cutting distance Y is easily carried out.

Figure 9:
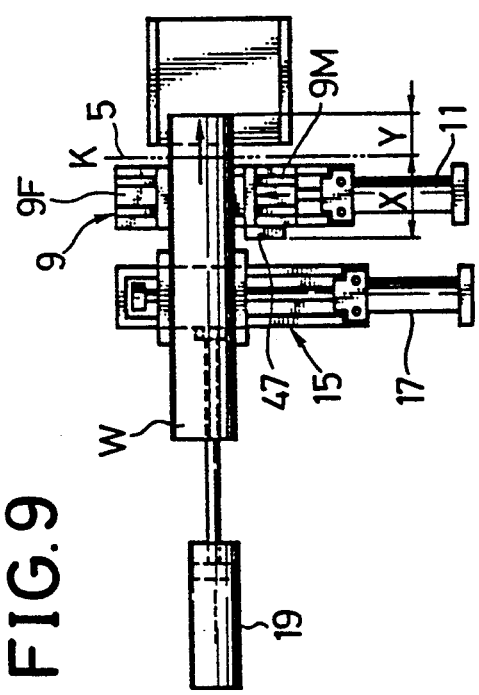

In Step $S_{13}$, the workpiece W is interposedly secured by the main vise device 9 (see FIG. 9).

In Step $S_{14}$, the clamping of the workpiece W by the feed vise device 15 is released.

In Step $S_{15}$, the feed vise device 15 is moved to the advanced end, and is positioned at the origin for normal automatic feeding; the origin is the position where the feed vise contact the main vise in this embodiment.

On the other hand, in Step $S_{11}$, if the switch 55 has been activated, the feed vise device 15 is positioned at the forward position, and the process is moved to Step $S_{17}$. Here, the distance by which workpiece W is moved by the feed vise device 15 is assumed to be D (see FIG. 10).

In Step $S_{17}$, the workpiece W is interposedly secured by the main vise device 9, and the feed vise device 15 releases the workpiece W.

In Step $S_{19}$, the feed vise device 15 retreat by a distance (C+x−D) so that the vise device 15 can feed the workpiece by the same distance (C+X−D) in next feeding step, wherein x is distance between the stopper 47 and cutting position k, and c is cut length by which the workpiece is to be cut in next cutting operation.

In Step $S_{20}$, the workpiece W is released from the main vise device 9 after the workpiece W has been clamped by the feed vise device 15.

In Step $S_{21}$, the feed vise device 15 advances to perform the feeding operation and the system returns to Step $S_{11}$.

As can be understood from the above explanation, in this embodiment the end of the workpiece W strike the stopper member 47 provided at a position for which the distance from the cutting position is known in addvance, and the positioning is carried out. Therefore, after the end of the workpiece W has been trimmed once, no further trimming is required. The workpiece W can be fed by the length of the cut dimension and positioned.

Figure 11:
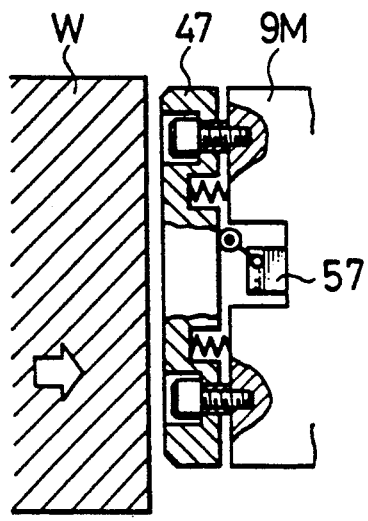
FIG. 11 and FIG. 12 are explanatory drawings showing another embodiment of a stopper member part.
Figure 12:
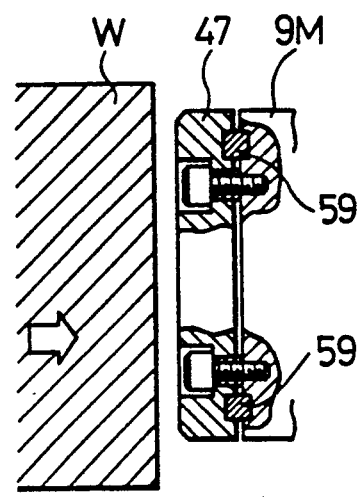

FIG. 11 and FIG. 12 show another embodiments for detecting when the end of the workpiece W contacts the stopper member 47. In the embodiments a microswitch 57 or a load cell 59 for detecting any very slight change in the stopper member 47 are mounted on the movable vise jaw 9M.

Figure 13:
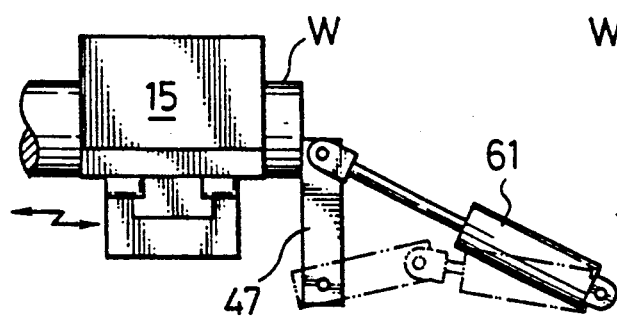
FIG. 13 is an explanatory drawing showing a configuration by which the stop member is alternately projected into and retracted from the pathway of the workpiece using a swinging motion.
Figure 14:
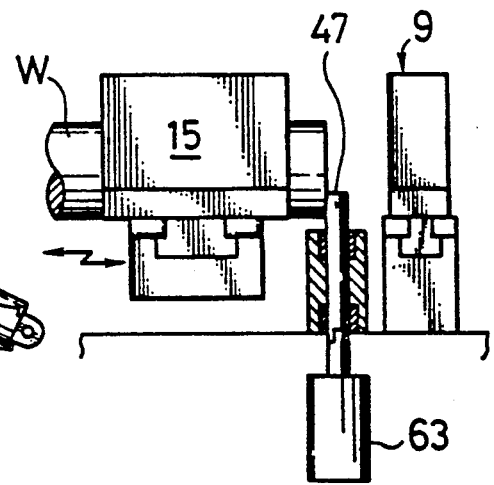
FIG. 14 is an explanatory drawing showing a configuration by which the stop member is alternately projected into and retracted from the pathway of the workpiece in a straight line motion.

In addition, the configuration shown in FIGS. 13 and 14, in which the stopper member 47 is not mounted on the main vice device 9, but on the frame of the machine so as to be projected to or retreated from the feed pathway of the workpiece W by a pair of hydraulic cylinder 61, 63, is also possible.

Figure 15:
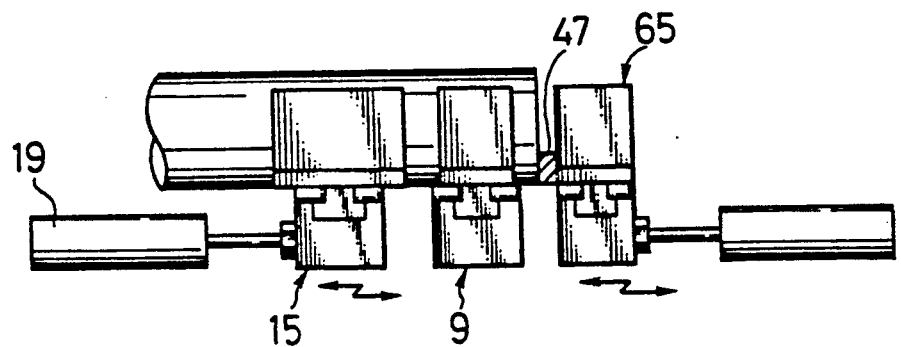
FIG. 15 is an explanatory drawing showing an embodiment which provides a stop member on a forward vise provided in front of the cutting position.

Another possible configuration is that shown in FIG. 15, wherein a front vise device 65 is provided in front of the cutting position in a freely advancing and retreating manner in the direction of the feeding of the workpiece W, and the stopper member 47 is provided on a movable vise jaw on the front vise device 65.

That is to say, the stopper member can be provided in any arbitrary position.

As can be readily understood from the explanation of the above embodiments, by means of the present invention, after the workpiece has been once positioned in a specified standard position, this workpiece is fed by a distance equal to the dimension of the cut. Therefore the position to which the end of the workpiece W is moved can always be calculated. Accordingly, in the case where the workpiece an end of which is once cut square is used, the workpiece can easily be fed by the amount of the cut dimension without any further trimming.

Although the invention has been described in its preferred embodiments, it is to be understood that various changes and modifications may be made within the purview of the appended claims without departing from the true scope and spirit of the invention in its broader aspects.

What is claimed is:

1. A method of positioning a front end of a workpiece which is to be cut in a cutting machine, comprising the steps of:
   (a) feeding the workpiece toward a cutting position of the cutting machine at which position a cutting tool of the cutting machine is provided;
   (b) detecting the front end of the workpiece at a specific distance in advance of the cutting position;
   (c) continuing the feeding of the workpiece toward the cutting position;
   (d) calculating the distance the workpiece has advanced after the front end of the workpiece has been detected according to step (b);
   (e) reducing the feed velocity of the workpiece when the distance moved by the workpiece is equal to a predetermined distance; and
   (f) halting the feeding of the workpiece after the velocity thereof is reduced and when the front end of the workpiece contacts a contact means provided at the cutting position of the cutting machine.

2. A method of positioning a front end of a workpiece with respect to a cutting position of a cutting machine at which position a cutting tool of the cutting machine is provided, comprising the steps of:
   (a) feeding the workpiece toward the cutting position of the cutting machine;
   (b) detecting the front end of the workpiece at a specific distance in advance of the cutting position;
   (c) continuing the feeding of the workpiece toward the cutting position;
   (d) calculating the distance the workpiece has advanced after the front end of the workpiece has been detected according to step (b);
   (e) reducing the feed velocity of the workpiece when the distance moved by the workpiece is equal to a first predetermined distance; and
   (f) halting the feeding of the workpiece after the velocity thereof is reduced and when the distance moved by the workpiece is equal to a second predetermined distance.

3. The method of positioning the end of the workpiece of claim 2, wherein after the feed velocity of the workpiece has been reduced, the feed velocity is further reduced before the end of the workpiece has advanced by a distance equal to the second predetermined distance.

4. The method of claim 2, wherein the feeding of the workpiece is halted when the front end of the workpiece reaches the cutting position of the cutting machine.

* * * * *